US010296911B2

(12) United States Patent
Clarke et al.

(10) Patent No.: US 10,296,911 B2
(45) Date of Patent: May 21, 2019

(54) SYSTEMS AND METHODS FOR RESCUING PURCHASE TRANSACTIONS

(71) Applicant: Ethoca Technologies, Inc., Toronto (CA)

(72) Inventors: Trevor Fred Roy Clarke, Maple (CA); Warren De Villiers, London (GB); Andre Ryan Edelbrock, Toronto (CA); Steve Frook, Toronto (CA); Darryl Green, Toronto (CA); Keegan Johnson, Toronto (CA)

(73) Assignee: Ethoca Technologies, Inc., Toronto (CA)

( * ) Notice: Subject to any disclaimer, the term of this patent is extended or adjusted under 35 U.S.C. 154(b) by 336 days.

(21) Appl. No.: 14/043,736

(22) Filed: Oct. 1, 2013

(65) Prior Publication Data

US 2015/0095215 A1 Apr. 2, 2015

(51) Int. Cl.
*G06Q 40/00* (2012.01)
*G06Q 20/40* (2012.01)
*G06Q 20/02* (2012.01)

(52) U.S. Cl.
CPC ......... *G06Q 20/4016* (2013.01); *G06Q 20/02* (2013.01)

(58) Field of Classification Search
None
See application file for complete search history.

(56) References Cited

U.S. PATENT DOCUMENTS

| | | | | |
|---|---|---|---|---|
| 6,826,536 | B1 | 11/2004 | Forman | |
| 7,761,380 | B2 | 7/2010 | Katz | |
| 7,941,352 | B2 | 5/2011 | Katz et al. | |
| 7,954,706 | B2 * | 6/2011 | Calabrese et al. | 235/380 |
| 8,275,705 | B2 | 9/2012 | Katz et al. | |
| 2007/0174214 | A1 | 7/2007 | Welsh et al. | |
| 2008/0021803 | A1 | 1/2008 | Ahles et al. | |
| 2008/0288405 | A1 | 11/2008 | John | |
| 2009/0307049 | A1 | 12/2009 | Elliott et al. | |
| 2010/0287099 | A1 | 11/2010 | Liu et al. | |
| 2011/0004498 | A1 | 1/2011 | Readshaw | |
| 2011/0251951 | A1 | 10/2011 | Kolkowitz et al. | |
| 2011/0276489 | A1 | 11/2011 | Larkin | |
| 2012/0047072 | A1 * | 2/2012 | Larkin | 705/44 |
| 2013/0091043 | A1 | 4/2013 | Leibon | |
| 2014/0108251 | A1 | 4/2014 | Anderson | |

* cited by examiner

*Primary Examiner* — Scott S Trotter
(74) *Attorney, Agent, or Firm* — Sheppard, Mullin, Richter & Hampton LLP

(57) ABSTRACT

Provided herein are techniques for rescuing a commercial transaction identified as suspect, possibly based on suspicion of fraud or due to the risk associated with the commercial transaction. Various implementations include systems and methods that can rescue a purchase transaction involving a purchasing party (hereafter, a "purchaser") and a selling party (hereafter, a merchant"). The item or items being purchased in the purchase transaction can include goods, a services, or property interests (e.g., real, intellectual, or otherwise). Particular implementations can facilitate the rescuing of a purchase transaction that has been declined, canceled or suspended (e.g., pending further review) by an involved party (e.g., the selling party) based on that party's concern (e.g., fraud or high risk) with respect to the purchase transaction.

14 Claims, 5 Drawing Sheets

SYSTEMS AND METHODS FOR RESCUING PURCHASE TRANSACTIONS

BACKGROUND

Various payment methods can be used when purchasing goods and services (also referred to herein as "purchase transactions"). However, it is possible for a criminal to fraudulently use a payment method, and particularly electronic payment methods such as credit cards and debit cards, which typically belong to some other person. The financial industry has taken efforts to ameliorate harm from fraud.

For example, a credit card issuer could call a cardholder after a credit card transaction is made in order to confirm that the cardholder was the one who was responsible for the transaction. If the cardholder denies making the credit card transaction, it may be the case that the transaction was fraudulent. After receipt of cardholder-confirmed fraudulent activity, the issuer can cancel the card, issue a new card, send the relevant information to a recovery department, etc. The issuer may or may not also process an affidavit and check for a refund. Finally, the issuer may or may not process a chargeback. The entire process can take weeks. Frequently, a merchant is contacted too late to do anything about the fraudulent transaction.

Another example for ameliorating the harm from fraud includes where merchants the merchant declines or cancels a transaction after receiving a pre-authorization (e.g., from an acquiring bank or an issuing bank) for payment by a credit card. In such instances, the merchant may decline or cancel a transaction based on merchant's suspicion that the purchase transaction is fraudulent, or based on some other concern the merchant has with the purchase transaction. In this way, the merchant can proactively avoid the hassle of dealing with some fraudulent payment transactions. Unfortunately, by declining or canceling the purchase transaction in this manner, the merchant also assumes the risk of being incorrect (e.g., suspicion of fraud was incorrect) and prematurely declining or canceling valid/legitimate purchase transactions. This can not only result in loss of sales for the merchant, but also cause the merchant to gain a less than favorable reputation amongst current and potential purchasers.

Other limitations of the relevant art will become apparent to those of skill in the art upon a reading of the specification and a study of the drawings.

SUMMARY

Provided herein are techniques for rescuing of a commercial transaction that is declined, canceled, or suspended by a party of the commercial transaction based on suspicion of the purchase transaction involving fraud, based on the purchase transaction involving a certain level of assessed risk, or the purchase transaction involving some other issue of concern (e.g., to the merchant). Herein, such purchase transactions are also referred to as "suspect purchase transactions." The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for rescuing a purchase transaction involving a purchasing party (hereafter, a "purchaser") and a selling party (hereafter, a merchant"). The item or items being purchased in the purchase transaction can include goods, a services, or property interests (e.g., real, intellectual, or otherwise). Particular implementations can facilitate the rescuing of a purchase transaction that has been declined, canceled or suspended (e.g., pending further review) by an involved party (e.g., the selling party) based on that party's concern (e.g., fraud or high risk) with respect to the purchase transaction.

As used herein, rescuing of a purchase transaction is intended to include the reinstatement, the reversal of status, or the resumption of a purchase transaction previously declined, canceled, or suspended. In some implementations, a purchase transaction can be declined, canceled or suspended by a merchant, a purchaser, or another transaction stakeholder (e.g., financial institution or payment processor) involved in the purchase transaction.

A system or method in accordance with some implementations can facilitate rescue of purchase transactions involving an electronic payment method processed using an authorization step and settlement step. For example, the system or method can facilitate rescue of a purchase transaction where a merchant: (a) receives from a purchaser a purchase order (e.g., for a good or service) using an electronic payment method processed by an authorization step and a settlement step; (b) obtains a pre-authorization code for payment by the electronic payment method for the purchase order (e.g., obtaining from an acquiring bank or an issuing bank an approval code for payment of a specific amount by a given credit or debit card); (c) identifies the purchase order as being suspect (e.g., based on merchant's suspicion of fraud); and (d) declines, cancels, or suspends the purchase order by not settling the payment before the pre-authorization for payment has expired (e.g., merchant does not include authorized payment and approval code in the batch sent to the payment processor during settlement).

The system or method can receive from the merchant (e.g., via the merchant's system) data regarding the purchase transaction between the purchaser and the merchant, and provide data regarding the purchase transaction to an electronic payment processing system associated with an electronic payment method. Subsequently, the system or method can receive from the electronic payment processing system data regarding validity of the purchase transaction (e.g., validity based on purchaser confirmation of the charge to the electronic payment method), and provide data to the merchant (e.g., the merchant's system) regarding a possibility of rescuing the purchase transaction based on the data regarding validity of the purchase transaction. Depending on the implementation, the time elapsed between initiation of a purchase transaction and the merchant receiving data regarding the possibility of rescuing the purchase transaction could be minutes (e.g., 15 minutes).

Use of various techniques described herein can benefit a merchant by preventing loss of sales and improve the consumer experience for purchasers who conduct business with the merchant. Use of various techniques described herein can also benefit one or more parties involved in processing electronic payments (e.g., issuing banks and acquiring banks) by providing such parties with data that they may not otherwise receive. The parties can use the data to detect electronic payment fraud that they might not otherwise detect or detect such fraud earlier than otherwise possible (e.g., before an accountholder reports the fraud or before payment settlement).

These and other advantages will become apparent to those skilled in the relevant art upon a reading of the following descriptions and a study of the several examples of the drawings.

DETAILED DESCRIPTION

Figure 1:
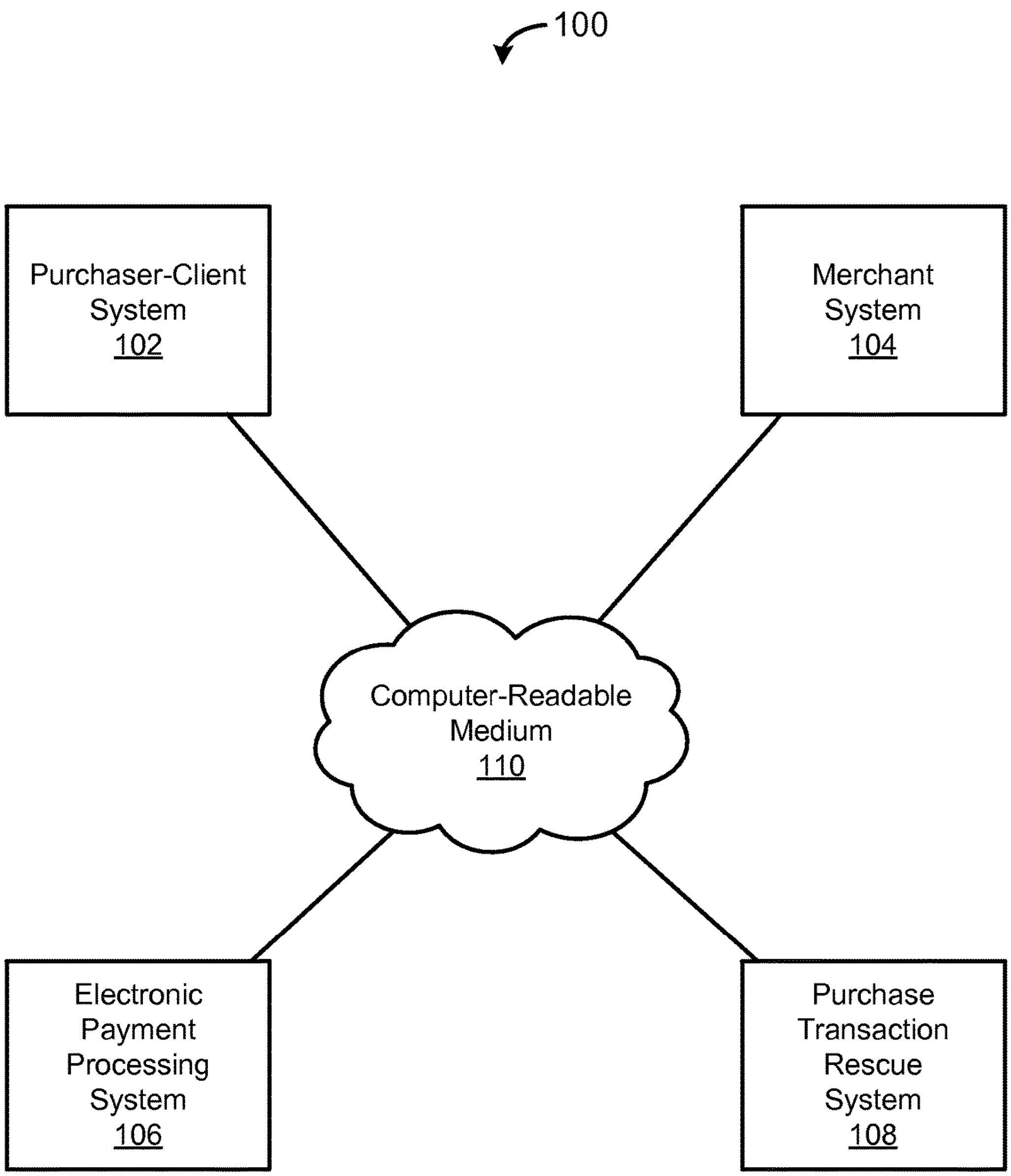
FIG. 1 depicts a diagram of an example system for rescuing transactions in accordance with some implementations.

FIG. 1 depicts a diagram 100 of an example system for rescuing transactions in accordance with some implementations. In the example of FIG. 1, the diagram 100 includes a purchaser-client system 102, a merchant system 104, an electronic payment processing system 106, a purchase transaction rescue system 108, and a computer-readable medium 110. Various implementations can include alternative arrangements or components than what is depicted in the example of FIG. 1. For example, in certain implementations, the functionality of the purchase transaction rescue system 108 can be incorporated into one or more of the merchant system 104 and the electronic payment processing system 106.

In a specific implementation, the purchaser-client system 102, the merchant system 104, the electronic payment processing system 106, and the purchase transaction rescue system 108 are implemented on one or more computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. In a specific implementation, the processor is configured to execute instructions stored on and/or provided by memory coupled to the processor.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGs. in this paper.

Figure 5:
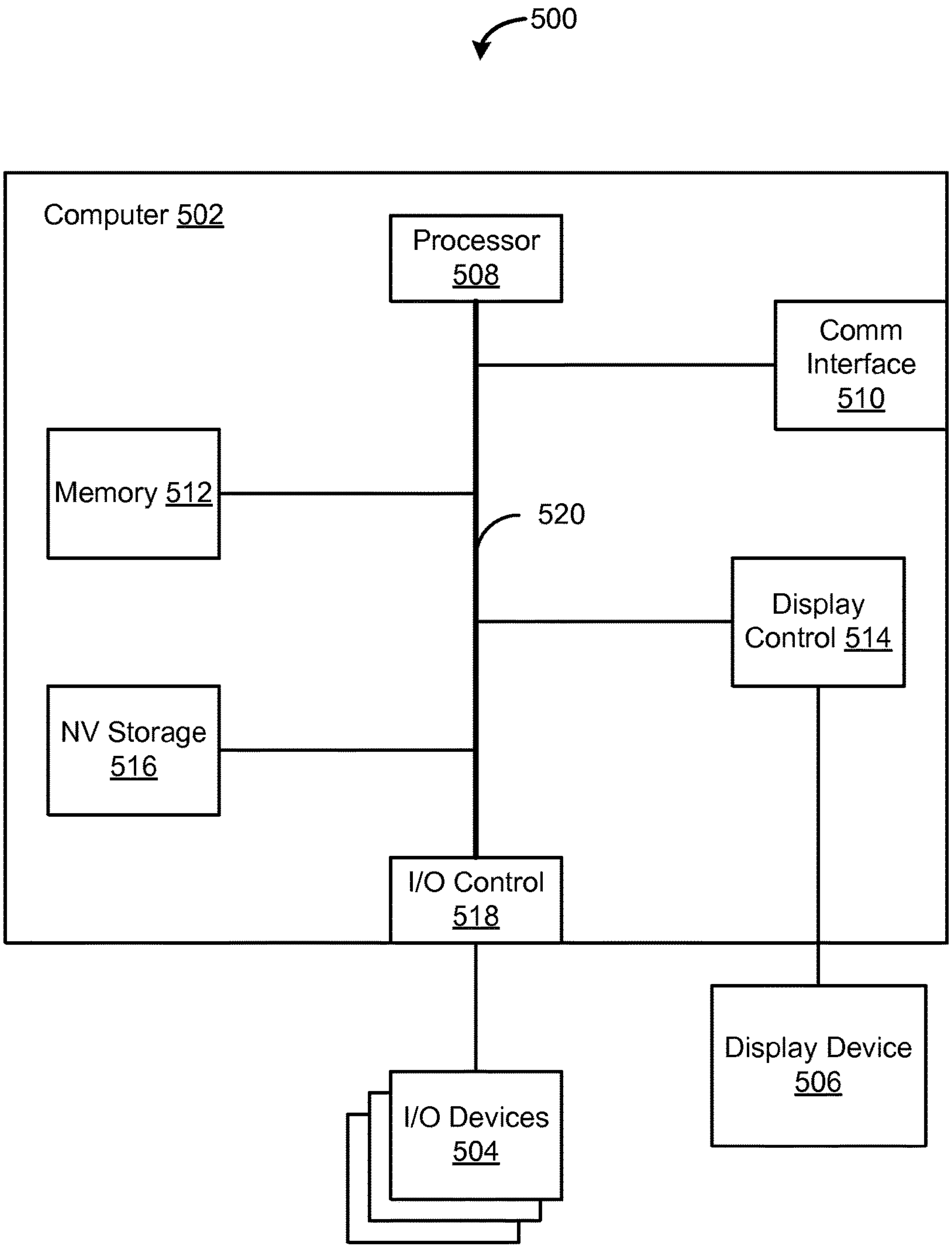
FIG. 5 depicts a diagram of an example system on which techniques described herein can be implemented.

More regarding computer systems is described herein with respect to FIG. 5, which depicts a diagram of an example system on which techniques described herein can be implemented.

As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, a network, a computer bus, to name a few), but may or may not be limited to hardware.

In the example of FIG. 1, the computer-readable medium 110 is intended to represent a variety of potentially applicable technologies that can communicatively couple together the purchaser-client system 102, the merchant system 104, the electronic payment processing system 106, and the purchase transaction rescue system 108. For example, the computer-readable medium 110 can be used to form a network or part of a network. Where two components are co-located on a device, the computer-readable medium 110 can include a bus or other data conduit or plane. Where a first component is located on one device and a second component is located on a different device, the computer-readable medium 110 can include a wireless or wired back-end network or LAN. The computer-readable medium 110 can also encompass a relevant portion of a WAN or other network, if applicable.

In the example of FIG. 1, the purchaser-client system 102 is coupled to the computer-readable medium 110. In a specific implementation, the purchaser-client system 102 can be understood to represent a purchasing party in a purchase transaction. For example, the purchaser-client system 102 facilitates a purchase transaction for a purchaser (e.g., on behalf of the merchant) that is purchasing a good, service, or property interest from a merchant (e.g., at the merchant system 104).

In a specific implementation, the purchaser-client system 102 includes a computing device physically accessible to an individual purchasing a good or service from a merchant, and operable in facilitating the individual's electronic payment to the merchant for the good or service. For example, the purchaser-client system 102 can include a desktop, laptop, smartphone, or tablet that permits an online purchaser at the purchaser-client system 102 to access an e-merchant website and purchase a good or service through the e-merchant website using an electronic payment method (e.g., credit card, debit card, or a financial cybermediary such as PayPal® or Google® Wallet).

In a specific implementation, a purchaser at the purchaser-client system 102 can submit an online order for a good or service through an e-merchant website and submit a form of electronic payment method, such as a credit card, debit card, or financial cybermediary, as payment for the online order. In this specific implementation, during a purchase transaction, the purchaser-client system 102 communicates with the merchant system 104, which can (in whole or in part) facilitate the purchase transaction on behalf of the merchant. More regarding the merchant system 104 is described herein. Though only one purchaser-client system 102 is illustrated in FIG. 1, the system can include more than one purchaser-client system 102 in various implementations.

As used herein, "payment" can include one or more of cash, check, debit, credit, or some other form of payment. Electronic forms of payment (hereafter referred to as "electronic payment methods") are facilitated by payment processing networks and/or devices. Accordingly, an "electronic payment" as used herein will be understood to be a payment made by an electronic payment method. Instances of electronic payment methods can include electronic bank transfers (e.g., wires or direct deposits using bank accounts), financial cybermediary (e.g., PayPal®), credit cards, debit cards, electronic bill presentment and payment (EBPP) (e.g., via Checkfree® or Quicken®), a digital wallet, and the like. In a specific implementation, a given electronic payment method includes, or is associated with, an account, and that the account can have one or more accountholders (e.g., cardholders) authorized to use the electronic payment method for payment in various transactions. Use of an electronic payment method can involve one or more parties capable of enabling processing of a payment by the electronic method, such as payment gateways, banks (e.g., acquiring banks or issuing banks), credit unions, credit card associations, and other various finance-related organizations.

Payment processing may or may not differ between different electronic payment methods. For example, processing of certain electronic payment methods can involve a separate processes for one or more of the following: verifying identifier(s) associated with electronic payment method (e.g., account number or accountholder name); authenticating the user of the electronic payment method (e.g., password or PIN number); pre-authorizing payment of a specific amount by the electronic payment method (e.g., obtaining an approval code for a payment transaction); settling payment by the electronic payment method (e.g., after pre-authorization of payment); and clearing payment by the electronic payment method (e.g., transferring funds from the purchaser's account to the merchant's account).

Use of electronic payment methods can include use of a form of electronic payment during the purchase of a good, service, or proper interest (hereinafter, "purchase transactions") by a purchasing party (hereafter, "purchaser") from a selling party (e.g., merchant or private seller). A purchase transaction can include, for example, a form of commercial transaction. Electronic payment methods can be useful when parties are remote with respect to each other during submission of payment. Such purchase transactions include those facilitated (in whole or in part) over a computer network (e.g., the Internet or an intranet) where, for example, an online purchaser (also referred to as an "online buyer" or "online shopper") can purchase a good or service from a merchant selling the good or service via a website (hereafter referred to as an "e-merchant"). Conventional examples of e-merchants include merchants that offer their goods or services exclusively (or primarily) online, such as Amazon®, Expedia®, and Travelocity®, and those merchants that offer their goods or services online and through physical retail stores (brick-and-mortar stores), such as Best Buy®, Wal-Mart®, and Target®. Use of electronic payment methods can also include use of any form of electronic payment during a purchase transaction made at a physical retail store, where a purchaser typically utilizes their electronic payment method of choice at a point-of-sale (POS) system (e.g., a credit/debit card terminal or a computer-based register). Use of electronic payment methods can further include use of any form of electronic payment during mobile commerce (m-commerce), where electronic payment is facilitated through mobile devices (e.g., smartphones and tablets).

As used herein, a purchase transaction "declined" by the merchant can include one where a request to purchase by purchaser is rejected by the merchant ab initio before the merchant confirms acceptance of the purchase transaction. A purchase transaction "canceled" by the merchant can include one where a request to purchase by the purchaser is initially accepted by the merchant but subsequently canceled by the merchant, possibly before payment process has been finalized (e.g., settled and cleared). A purchase transaction "suspended" by the merchant can include one where the merchant may or may not have accepted a request to purchase by the purchaser and the merchant has suspended the purchase transaction pending further review.

In the example of FIG. 1, the merchant system 104 is coupled to the computer-readable medium 110. In a specific implementation, the merchant system 104 represents a selling party in a purchase transaction. For example, the merchant system 104 can facilitate a purchase transaction for a merchant (e.g., on behalf of the merchant) that is selling a good, service, or property interest to a purchaser (e.g., at the purchaser-client system 102). Depending on the implementation, the merchant system 104 can perform various operations in relation to purchase transactions, including: providing a listings of items available for purchase (e.g., to the purchaser at the purchaser-client system 102); receiving and processing purchase orders (e.g., from the purchaser at the purchaser-client system 102) that initiate purchase transactions, which can include collecting purchaser information, collecting payment information, submitting payment for processing, and facilitating delivery of the purchased item (e.g., physical or electronic delivery to the purchaser at the purchaser-client system 202); detecting purchase orders that are suspect (e.g., due to suspicious of fraud or considered high risk); and facilitating rescue of those purchase orders indicated (e.g., by the purchase transaction rescue system 108) as being candidates for rescue. For example, the merchant system 104 may, in whole or in part, implement an e-merchant website accessible by a purchaser (e.g., via the purchaser-client system 102) and capable of receiving from the purchaser a purchase order including an electronic payment method for purchase of a good or service offered through the e-merchant website. As described herein, during a purchase transaction, the purchaser-client system 102 can communicate with the merchant system 104. Additionally, in some implementations, the merchant system 104 can utilize the electronic payment processing system 106 in processing electronic payments methods received by the merchant system 104 in connection with purchase transactions handled by the merchant system 104.

In a specific implementation, the merchant system 104 is operable in identifying suspect purchase transactions that are potentially fraudulent, that pose a predetermined risk to the merchant, or that would otherwise cause the merchant concern. Depending on the implementation, identification of such suspect purchase transactions may or may not involve analyzing various factors associated with the purchase transaction including, for example: the specific payment method selected for use in the purchase transaction (e.g., type of electronic payment method); the purchase history of the purchaser involved in the purchase transaction; the purchase history of the item (e.g., good or service) being sold; the cost of the purchase order (e.g., total cost of the purchase order or the cost of individual items therein); and analytics performed on purchases (e.g., analytics generated by the merchant or by a third-party service). In certain implementations, the identification of suspect purchase transactions can be facilitated by the merchant system 104, the electronic payment processing system 106, or some combination thereof.

In the example of FIG. 1, the electronic payment processing system 106 is coupled to the computer-readable medium 110. In a specific implementation, the electronic payment processing system 106 can be understood to represent the one or more parties responsible for performing payment processing for the purchase transaction.

In a specific implementation, the electronic payment processing system 106 processes payments made using one or more electronic payment methods. For example, during a purchase transaction, the merchant system 104 can receive payment by electronic payment method and process the payment using the electronic payment processing system 106. According to certain implementations, the electronic payment processing system 106 can comprise systems associated various forms of electronic payments including, credit card, debit card, wire transfers (e.g., from a bank account), financial cybermediaries (e.g., PayPal®). For example, to facilitate payment by credit card or debit card, the electronic payment processing system 106 can comprise one or more various systems associated with an issuing bank, an acquiring bank, a payment processor, or a payment gateway provider.

In the example of FIG. 1, the purchase transaction rescue system 108 is coupled to the computer-readable medium 110. In a specific implementation, the purchase transaction rescue system 108 can facilitate the rescue (e.g., reinstate, reverse the status, or resume) of a purchase transaction that has been declined, canceled, or suspended by the merchant. For some implementations, the purchase transaction rescue system 108 can rescue one or more purchases transactions that are handled by the merchant system 104. The purchase transactions to be rescued may be one identified by the merchant system 104 as being suspected of fraud, as having an assessed risk that meets or exceeds a risk threshold, or as having some other issue of concern to the merchant.

In a specific implementation, during a rescue operation, the purchase transaction rescue system 108 can receive from the merchant system 104 data regarding a purchase transaction that involves pre-authorized electronic payment (i.e., a pre-authorized payment by an electronic payment method), but where the pre-authorized electronic payment has yet to be settled by the merchant (e.g., through the merchant system 104). The data regarding the purchase transaction can include, for example, a purchase transaction identifier (e.g., used to identify the purchase transaction in the merchant system 104), information regarding the purchaser (e.g., contact information, addresses, or personal information), payment information (e.g., electronic payment method related information, such as an accountholder name, an account number, verification number, PIN number, type of electronic payment method, billing address, payment amount, authorization status, approval codes, and the like), information regarding the current status of the purchase transaction (e.g., declined, canceled, or suspended by the merchant), or information regarding an item being purchased during the purchase transaction. The purchase transaction in question may or may not be associated with a pre-authorization obtained by the merchant system 104, possibly through the electronic payment processing system 106. The merchant system 104 could, for example, obtain the pre-authorization by submitting to the electronic payment processing system 106 an amount to be charged ("charge amount") to the electronic payment method and the merchant system 104 receiving an authorization/approval code for the charge in return from the electronic payment processing system 106. Based on the authorization, the electronic payment processing system 106 can cause the charge amount to be reserved/held from the credit limit associated with the electronic payment method, and can involve the electronic payment processing system 106 interfacing with one or more systems associated with an acquiring bank, issuing bank, or payment processor. Depending on the electronic payment method, the reserved charge amount can eventually "fall off" (e.g., reservation expires or the charge is reversed) when the merchant (e.g. via the merchant system 104) does not submit the pre-authorized payment (e.g., the electronic payment processing system 106) for clearing and settlement. For instance, where the electronic payment method is a credit card or debit card, the settlement process can involve the merchant system 104 transferring a pre-authorized payment to an acquiring bank or an issuing bank during batch transfer (e.g., where the batch includes electronic payment transactions stored with an authorization obtained during a pre-authorization process). When a merchant desires to decline or cancel a purchase transaction, the merchant system 104 may refrain from settling the pre-authorized payment by the electronic payment method.

The rescue operation can continue with the purchase transaction rescue system 108 providing data regarding the purchase transaction to the electronic payment processing system 106, where the merchant system 104 has pre-authorized payment (for the purchase transaction) by the electronic payment method but payment has yet to be settled by the merchant system 104. In some implementations, this data can comprise information regarding the purchase transaction that financial institutions (e.g., acquiring bank and issuing banks) would not otherwise receive (e.g., via the electronic payment processing system 106). This may or may not be where the merchant has declined, canceled, or suspended the purchase transaction after payment pre-authorization payment but before payment settlement, thereby resulting in the pre-authorization falling off without the merchant providing a reason for the fall off.

The data provided by the purchase transaction rescue system 108 to the electronic payment processing system 106 can comprise some or all of the data that the purchase transaction rescue system 108 previously received from the merchant system 104. Accordingly, the data regarding the purchase transaction provided by the purchase transaction rescue system 108 to the electronic payment processing system 106 can include, for example, a purchase transaction identifier (e.g., used to identify the purchase transaction in the merchant system 104), information regarding the purchaser (e.g., contact information, addresses, or personal information), payment information (e.g., electronic payment method related information, such as an accountholder name, an account number, verification number, PIN number, type of electronic payment method, billing address, payment amount, authorization status, approval codes, and the like), information regarding the current status of the purchase transaction (e.g., declined, canceled, or suspended by the merchant), or information regarding an item being purchased during the purchase transaction.

Using this data, the electronic payment processing system 106 can verify with an accountholder associated with the electronic payment method, the validity of the payment by the electronic payment method for the purchase transaction. In some implementations, the validity of a given purchase transaction can be determined, in whole or in part, by confirming the validity of the electronic payment involved in the purchase transaction.

For certain electronic payment methods, such as credit or debit cards, a financial institution (e.g., an issuing bank or acquiring bank) could verify the validity of the payment by the electronic payment method through a fraud risk assessment process that confirms that the accountholder associated with the electronic payment method (e.g., cardholder) was responsible for payment made with the electronic payment method in connection with the purchase transaction. In some instances, the fraud assessment process can include a call-back process, where a financial institution contacts (e.g., calls or electronically messages) one or more accountholders associated with an electronic payment method to solicit verification of a specific payment by that electronic payment method. For example, the call-back process can entail an issuing bank making an automated (or semi-automated) phone call to an accountholder associated with the electronic payment method to solicit a verbal confirmation of the payment by the electronic payment method. In another example, the call-back process can involve an electronic message (e.g., SMS message to a mobile phone or an e-mail) to an accountholder associated with the electronic payment method, where the electronic message may or may not solicit and receive a response from the accountholder confirming or denying the payment by the electronic payment method. It should be noted that where there is two or more accountholders associated with a given electronic payment method (e.g., credit or debit card with two or more authorized users), the financial institution could confirm the payment with one, some or all of the accountholders, or could confirm the payment the accountholder identified in the purchase transaction information.

It should be noted that there can be purchase transactions where the accountholder and the purchaser are different individuals and the purchase transactions remain valid. Such purchase transactions can include those where the purchaser in a purchase transaction is not the accountholder but has the accountholder's permission to use electronic payment method associated with the accountholder.

In some implementations, the call-back process can involve, in whole or in part, manual processes performed by humans. For example, the call-back process can comprise a human operator at an issuing bank calling the accountholder on the phone. Where human operators are involved in the call-back process, they may or may not receive information regarding the suspect purchase transaction via a computer-accessible information portal (e.g., authentication-based website) provided by the organization employing the human operator (e.g., the issuing bank) or provided by the organization facilitating the rescue of suspect purchase transactions (e.g., organization operating the purchase transaction rescue system 108).

Subsequently, the rescue operation can continue with the purchase transaction rescue system 108 receiving from the electronic payment processing system 106 data regarding validity of the purchase transaction (e.g., where validity is based on an accountholder confirming or denying the payment by the electronic payment method). The data could comprise a response solicited by the electronic payment processing system 106 from an accountholder associated with the electronic payment method regarding the validity of the purchase transaction, or data based on such a response (e.g., data generated by the electronic payment processing system 106 based on the response).

Eventually, the purchase transaction rescue system 108 can determine whether it is possible for the purchase transaction to be rescued, based in whole or in part on the data regarding validity of payment by the electronic payment method (e.g., received from the electronic payment processing system 106), the data regarding the purchase transaction (e.g., received from the merchant system 104), or some combination thereof. In determining the possibility of rescue, the purchase transaction rescue system 108 can consider one or more of the following example factors: the current status of the purchase transaction (e.g., is the purchase transaction declined, canceled, or suspended); whether the pre-authorization has already expired; what item(s) are being purchased; whether the payment by the electronic payment method has been confirmed as valid; and the current risk associated with the purchase transaction (which may or may not account for the confirmation status of the payment).

Upon determining that the purchase transaction is a candidate for rescue, the purchase transaction rescue system 108 can inform the merchant system 104 (or alternatively directly inform the purchaser) of the possibility to rescue the purchase transaction. In some implementations, the purchase transaction rescue system 108 can inform the merchant system 104 by providing the merchant system 104 with data regarding the validity of the purchase transaction, where such data may or may not comprise some or all of the validity-related data the purchase transaction rescue system 108 received from the electronic payment processing system 106. Additionally, the purchase transaction rescue system 108 can inform by providing the merchant system 104 with a purchase transaction identifier, providing a reason for the possibility of rescue (e.g., details regarding the possibility determination by the purchase transaction rescue system 108), or a combination of both. After being informed of the possibility of the purchase transaction being rescued, the merchant system 104 may or may not initiate a rescue process, whereby the purchase transaction can be reinstated or its current state changed (e.g., declined or canceled purchase transaction is reinstated, or the status reversed from suspended to resumed).

Figure 2:
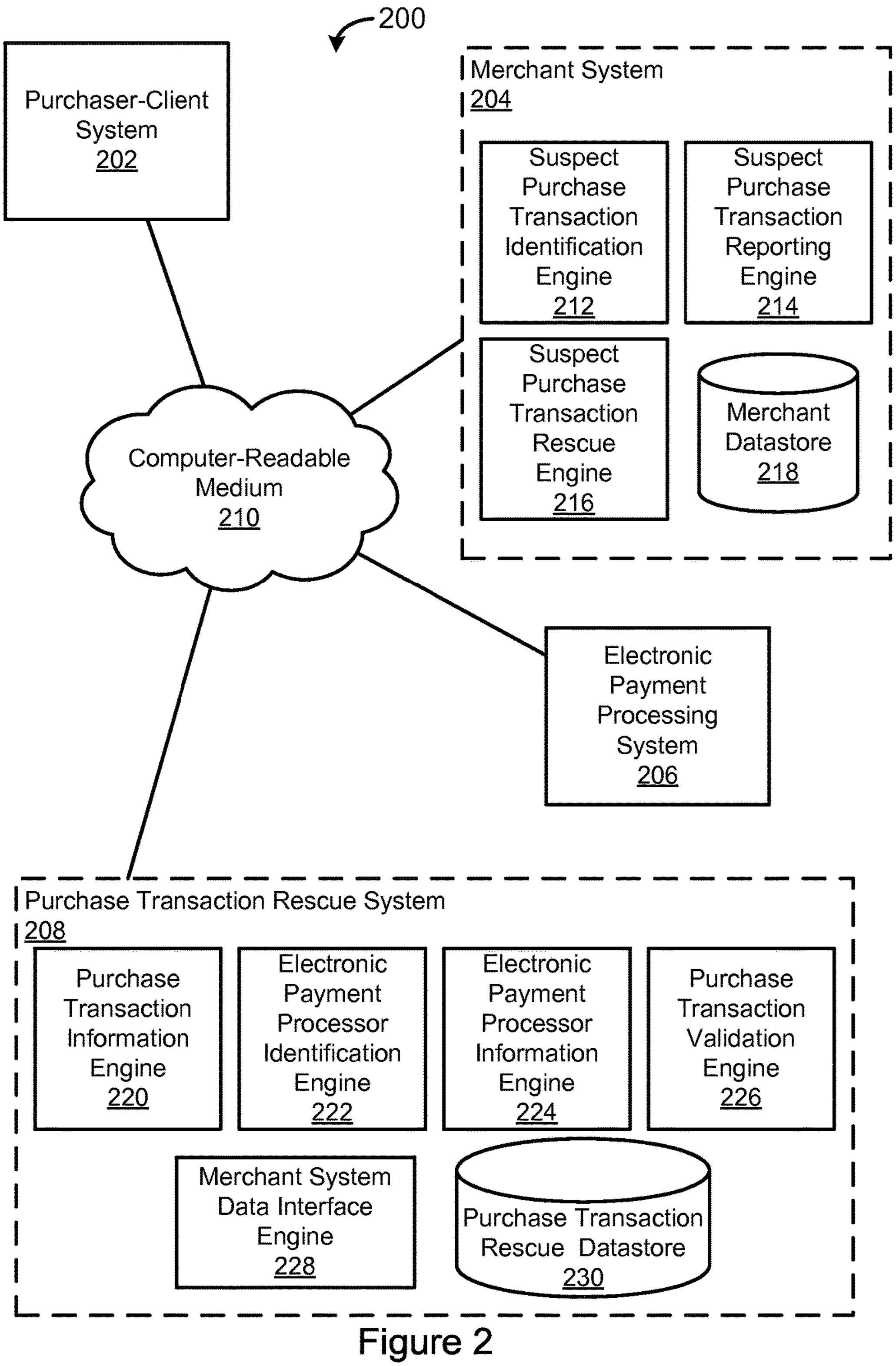
FIG. 2 depicts a diagram of an example system for rescuing transactions in accordance with some implementations.

FIG. 2 depicts a diagram of an example system for rescuing transactions in accordance with some implementations. In the example of FIG. 2, the diagram 200 includes a purchaser-client system 202, a merchant system 204, an electronic payment processing system 206, a purchase transaction rescue system 208, and a computer-readable medium 210. Various implementation can include alternative arrangements or components than what is depicted in FIG. 2. Additionally, the purchaser-client system 202, the merchant system 204, the electronic payment processing system 206, and the purchase transaction rescue system 208 can be implemented on one or more computer systems.

In example of FIG. 2, the computer-readable medium 210 is intended to represent a variety of potentially applicable technologies that can communicatively couple together the purchaser-client system 202, the merchant system 204, the electronic payment processing system 206, and the purchase transaction rescue system 208. For instance, the computer-readable medium 210 can be used to form a network or part of a network.

In the example of FIG. 2, the purchaser-client system 202 is coupled to the computer-readable medium 210. In some implementations, the purchaser-client system 202 can comprise a computing device that is physically accessible to an individual purchasing a good or service from a merchant, and that is operable in facilitating the individual's electronic payment to the merchant for the good or service. Examples of the purchaser-client system 202 can include a desktop, laptop, smartphone, or tablet that permits an online purchaser at the purchaser-client system 102 to access an e-merchant website and purchase a good or service through the e-merchant website using an electronic payment method (e.g., credit card, debit card, or a financial cybermediary such as PayPal® or Google® Wallet). During a purchase transaction, the purchaser-client system 102 can communicate with the merchant system 104, which can (in whole or in part) the purchase transaction on behalf of the merchant. Though only one purchaser-client system 202 is illustrated in FIG. 2, implementations that include more than one purchaser-client system 202 are possible.

In the example of FIG. 2, the merchant system 204 is coupled to the computer-readable medium 210, and comprises a suspect purchase transaction identification engine 212, a suspect purchase transaction reporting engine 214, a suspect purchase transaction rescue engine 216, and a merchant datastore 218. In some implementations, the merchant system 204 can facilitate a purchase transaction for a merchant (e.g., on behalf of the merchant) of that is selling a good or service to a purchaser (e.g., at the purchaser-client system 202). For example, the merchant system 204 can perform such operations as: providing a listings of items available for purchase (e.g., to the purchaser at the purchaser-client system 202), receiving and processing purchase orders (e.g., from the purchaser at the purchaser-client system 202) that initiate purchase transactions, and facilitating delivery of the purchased item (e.g., physical or electronic delivery to the purchaser at the purchaser-client system 202).

Additionally, the merchant system 204 can facilitate detecting purchase orders that are suspect (e.g., suspicious of fraud or considered high risk), and facilitating rescue of those purchase orders indicated (e.g., by the purchase transaction rescue system 208) as being candidates for rescue. The merchant system 204 can perform such operations through use of one or more of the suspect purchase transaction identification engine 212, the suspect purchase transaction reporting engine 214, the suspect purchase transaction rescue engine 216, and the merchant datastore 218.

For example, the suspect purchase transaction identification engine 212 can be configured to identify as suspect those purchase transactions that are potentially fraudulent, that pose a predetermined risk to the merchant, or that would otherwise cause the merchant concern. As described herein, those purchase transactions that the suspect purchase transaction identification engine 212 can be declined, canceled, or suspended due to their suspect status. Depending on the implementation, the suspect purchase transaction identification engine 212 may or may not be responsible for declining, canceling, or suspending purchase transaction identified as suspect. According to some implementations, a purchase transaction that is declined, canceled, or suspended can be rescued by, and at the discretion of, the suspect purchase transaction rescue engine 216. As described herein, the rescue of suspect purchase transaction by suspect purchase transaction rescue engine 216 based, at least in part, on information provided by the purchase transaction rescue system 208 to merchant system 204. More regarding the suspect purchase transaction rescue engine 216 is discussed herein.

The suspect purchase transaction identification engine 212 could identify such suspect purchase transactions by analyzing such factors as the specific electronic payment method selected for use in the purchase transaction (e.g., type of electronic payment method), the purchase history of the purchaser involved in the purchase transaction, the purchase history of the item (e.g., good or service) being sold, the cost of the purchase order (e.g., total cost of the purchase order or the cost of individual items therein), or various analytics performed on purchases (e.g., analytics generated by the merchant or by a third-party service). For some implementations, such information could be stored on, and later retrieved from, the merchant datastore 218. In some implementations, the suspect purchase transaction identification engine 212 can employ algorithms commonly utilized by the various organizations in the financial industry to identify suspect purchase transactions. In certain implementations, the identification of suspect purchase transaction can involve the suspect purchase transaction identification engine 212 intervention by a human operator, possibly one that is associated with the merchant of the merchant system 204. For instance, upon the suspect purchase transaction identification engine 212 identifying one or more purchase transactions as suspect, the suspect purchase transaction identification engine 212 can solicit input from an analyst for the merchant who can analyze details regarding the purchase transactions and confirm their suspect status. In some implementations, purchase transactions can be identified as suspect based on a preference or setting associated with (and possibly controlled by) the merchant associated with the merchant system 204.

The suspect purchase transaction reporting engine 214 can be configured to provide the purchase transaction rescue system 208 with data regarding those purchase transactions that the merchant system 204 has identified as suspect. In doing so, the suspect purchase transaction reporting engine 214 can initiate process by which the purchase transaction rescue system 208 can determine the possibility of rescuing the suspect purchase transactions identified by the suspect purchase transaction identification engine 212. The data provided by the suspect purchase transaction reporting engine 214 can include some or all of the data the suspect purchase transaction identification engine 212 utilized in identifying the purchase transactions as suspect. As described herein, data regarding a purchase transaction can include a purchase transaction identifier (e.g., used to identify the purchase transaction in the merchant system 104), information regarding the purchaser (e.g., contact information, addresses, or personal information), payment information (e.g., electronic payment method related information, such as an accountholder name, an account number, verification number, PIN number, type of electronic payment method, billing address, payment amount, authorization status, approval codes, and the like), information regarding the current status of the purchase transaction (e.g., declined, canceled, or suspended by the merchant), or information regarding an item being purchased during the purchase transaction. For some implementations, such data could be stored on and retrieved from the merchant datastore 218.

The suspect purchase transaction rescue engine 216 can be configured to receive from the purchase transaction rescue system 208 data that identifies which suspect purchase transactions, reported by the suspect purchase transaction reporting engine 214 to the purchase transaction rescue system 208, are candidates for rescue. In certain implementations, the data received by the suspect purchase transaction rescue engine 216 can include data regarding the validity of the purchase transaction, where such data may or may not comprise some or all of the validity-related data the purchase transaction rescue system 208 obtained via the electronic payment processing system 206. The data can further include information (e.g., purchase transaction number) that identifies, or enables the merchant system 204 to identify, which purchase transactions are candidates for rescue. After receiving the data from the purchase transaction rescue system 208, the suspect purchase transaction rescue engine 216 can initiate a rescue process with respect to one or more of the suspect purchase transactions identified in the received data as candidates for rescue. As described herein, a rescue process can possibly reinstate or reverse the status of suspect purchase transactions that have been declined, canceled, or suspended at the merchant system 204 (e.g., due to the purchase transactions being suspect).

Before initiating a rescue process with respect to a candidate purchase transaction, the suspect purchase transaction rescue engine 216 may or may not perform further analysis of the candidate purchase transaction to determine whether a rescue process should be initiated for the candidate purchase transaction. Such an analysis may utilize the data received by the suspect purchase transaction rescue engine 216 from the purchase transaction rescue system 208. In some instances, a purchase transaction may continue to involve a high level of risk even after being identified as a candidate for rescue.

The merchant datastore 218 can store and provide data that supports operations performed by the merchant system 204. For instance, data stored on the merchant datastore 218 can include data regarding purchase transactions being handled by the merchant datastore 218. Such data could enable the merchant system 204 to process of purchase transactions and rescue suspect purchase transactions in various implementations.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Though not shown in FIG. 2, the purchaser-client system 202 and the electronic payment processing system 206 can have one or more datastores that facilitate their respective operation.

In the example of FIG. 2, the electronic payment processing system 206 is coupled to the computer-readable medium 210. In some implementations, the electronic payment processing system 206 can facilitate processing of payment made using one or more electronic payment methods. As described herein, during a purchase transaction, the merchant system 204 can receive payment by electronic payment method and process the payment using the electronic payment processing system 206. According to certain implementations, the electronic payment processing system 206 can comprise systems associated various forms of electronic payments including, credit card, debit card, wire transfers (e.g., from a bank account), financial cybermediaries (e.g., PayPal®). For example, to facilitate payment by credit card or debit card, the electronic payment processing system 206 can comprise one or more various systems associated with an issuing bank, an acquiring bank, a payment processor, or a payment gateway provider.

As also described herein, the electronic payment processing system 206 can facilitate validation of a payment made in a purchase transaction using an electronic payment method. The electronic payment processing system 206 can receive data regarding a purchase transaction that the electronic payment processing system 206 can use the data to perform a fraud assessment process, such a call-back process, that can confirm the validity of a payment made using the electronic payment method (e.g., confirm with the accountholder associated with the electronic payment method).

In the example of FIG. 2, the purchase transaction rescue system 208 is coupled to the computer-readable medium 210, and comprises a purchase transaction information engine 220, an electronic payment processor identification engine 222, an electronic payment processor information engine 224, a purchase transaction validation engine 226, a merchant system data interface engine 228, and a purchase transaction rescue datastore 230. In some implementations, the purchase transaction rescue system 208 can facilitate the rescue (e.g., reinstate, reverse the status, or resume) of those purchase transactions that the merchant system 204 identifies as suspect. In certain implementations, the purchase transaction rescue system 208 can facilitate rescue of suspect purchase transaction through use of one or more of the purchase transaction information engine 220, the electronic payment processor identification engine 222, the electronic payment processor information engine 224, the purchase transaction validation engine 226, the merchant system data interface engine 228, and the purchase transaction rescue datastore 230.

For example, the purchase transaction information engine 220 can be configured to receive from the merchant system 204 data regarding those purchase transactions the merchant system 204 has identified as suspect (e.g., via the suspect purchase transaction identification engine 212). The data regarding the purchase transaction can include, for example, a purchase transaction identifier (e.g., used to identify the purchase transaction in the merchant system 104), information regarding the purchaser (e.g., contact information, addresses, or personal information), payment information (e.g., electronic payment method related information, such as an accountholder name, an account number, verification number, PIN number, type of electronic payment method, billing address, payment amount, authorization status, approval codes, and the like), information regarding the current status of the purchase transaction (e.g., declined, canceled, or suspended by the merchant), or information regarding an item being purchased during the purchase transaction.

The electronic payment processor identification engine 222 can be configured to identify one or more electronic payment processors associated with the electronic payments used in the suspect purchase transactions identified and reported by the merchant system 204. The electronic payment processor identification engine 222 can identify a given electronic payment processors for each of the suspect transactions. For a particular electronic payment, the electronic payment processor identification engine 222 can identify a electronic payment processor based on one or more of the following: the electronic payment processor's ability to process the electronic payment (e.g., which can determined by type of electronic payment method associated with the electronic payment); a preference or setting associated with the merchant of the merchant system 204; the amount of the electronic payment; and the availability of the electronic payment processor (e.g., based on the electronic payment processor's current workload or status). The identification information generated or gathered by the electronic payment processor identification engine 222 can be utilized by the electronic payment processor information engine 224 when the electronic payment processor information engine 224 attempts to validate the electronic payments involved in each of the suspect purchase transactions.

The electronic payment processor information engine 224 can be configured to obtain validation for each electronic payment associated with the suspect purchase transactions. In accordance with some implementations, the electronic payment processor information engine 224 can utilize from one or more electronic payment processors to obtain the validation. In some implementations, the electronic payment processor information engine 224 request the electronic payment processors identified by the electronic payment processor identification engine 222 to validate the electronic payments associated with the suspect purchase transactions. The requests may or may not be according to the identification information provided by the electronic payment processor identification engine 222 (e.g., information that maps each electronic payment to a suitable electronic payment processor).

In certain implementations, the request validation can comprise providing data regarding suspect purchase transactions to the electronic payment processors, where such data can include information regarding the electronic payments involved in the suspect purchase transaction. The electronic payment processors receiving the data can use the received data in executing fraud assessments processes (e.g., call-back processes) with respect to the electronic payments, which may or may not result in the confirmation of the validity of each electronic payment by its associated accountholder.

The purchase transaction validation engine 226 can be configured to receive from one or more electronic payment processors data regarding the validity of electronic payments used in the suspect purchase transactions. The purchase transaction validation engine 226 can receive such data in response to the data submitted by the electronic payment processor information engine 224 to the electronic payment processors. The data returned by the electronic payment processors may or may not provide the validity of all of the electronic payments the electronic payment processor information engine 224 submitted to the electronic payment processors. The time elapsed between the electronic payment processor information engine 224 submitting data to a given electronic payment processor, and the purchase transaction validation engine 226 receiving data back from the given electronic payment processor can depend on the given electronic payment and the validation process utilized by the given electronic payment. For example, where an electronic payment processor uses a message-based call-back process to confirm the validity of an electronic payment, the time elapsed can be minutes. Based on the electronic payment validity data received by the purchase transaction validation engine 226, the purchase transaction rescue system 208 can identify those suspect purchase transactions that would qualify as candidates for rescue by the merchant system 204.

The merchant system data interface engine 228 can be configured to provide the merchant system 204 with data regarding the possibility of rescuing one or more of the suspect purchase transactions identified in the data received by the purchase transaction information engine 220.

The purchase transaction rescue datastore 230 can store and provide data that supports operations performed by the purchase transaction rescue system 208. For instance, data stored on the purchase transaction rescue datastore 230 can include data regarding suspect purchase transactions being handled by the merchant system 204 and reported to the purchase transaction rescue system 208 by the merchant system 204. Such data can enable the purchase transaction rescue datastore 230 to identify suspect purchase transactions that are candidates for rescue by the merchant system 204.

Figure 3:
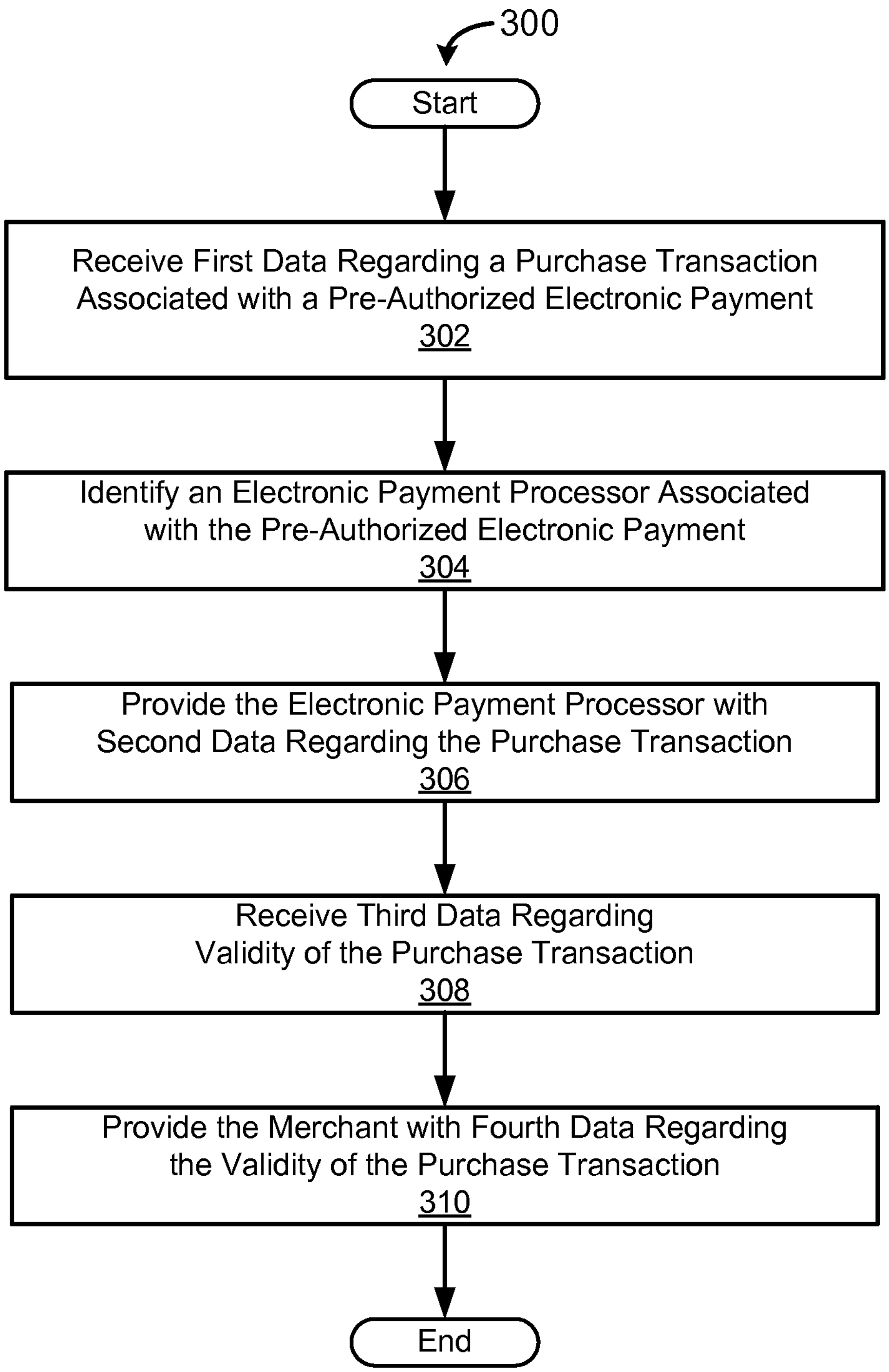
FIG. 3 depicts a flowchart of an example method for rescuing transactions in accordance with some implementations.

FIG. 3 depicts a flowchart 300 of an example method for rescuing transactions in accordance with some implementations. In some implementations, the modules of the flowchart 300 can be reordered to a permutation of the illustrated order of modules or reorganized for parallel execution. In accordance with various implementations, the method illustrated by the flowchart 300 can be performed, in whole in part, by a purchase transaction rescue system. In the example of FIG. 3, the flowchart 300 begins at module 302 with receiving first data regarding a purchase transaction associated with a pre-authorized electronic payment (i.e., pre-authorized payment using an electronic payment method). The purchase transaction could be one identified by a merchant as a suspect purchase transaction (e.g., suspected of involving fraud or involving unacceptable risk). The identification may or may not be automatically facilitated by a merchant system that is associated with the merchant. Additionally, the merchant system associated with the merchant may or may not be the provider of the first data regarding the purchase transaction. The merchant system can be one that, in whole or in part, handles processing of the purchase transaction.

As described herein, the data regarding the purchase transaction can include, for example, a purchase transaction identifier, information regarding the purchaser, payment information, information regarding the current status of the purchase transaction (e.g., declined, canceled, or suspended by the merchant), or information regarding an item being purchased during the purchase transaction.

In the example of FIG. 3, the flowchart 300 continues to module 304 with identifying an electronic payment processor associated with the pre-authorized electronic payment.

The electronic payment processor identified may or may not be the one that originally provided pre-authorization for the electronic payment. In some implementations, identifying the electronic payment processor may comprise analyzing the electronic payment method associated with the pre-authorized electronic payment (e.g., analyzing the type of the electronic payment method, an identifier associated with the electronic payment method, or accountholder associated with the electronic payment method), identifying one or more electronic payment processors capable of processing payment by the electronic payment method, or identifying one or more electronic payment processor systems associated with the identified electronic payment processors.

In the example of FIG. 3, the flowchart 300 continues to module 306 with providing the electronic payment processor with second data regarding the purchase transaction. In some implementations, the data provided to the electronic payment processor can include some or all of the first data received at module 302.

In the example of FIG. 3, the flowchart 300 continues to module 308 with receiving third data regarding validity of the purchase transaction. In certain implementations, the third data regarding validity of the purchase transaction can comprise data regarding whether an accountholder associated with the pre-authorized electronic payment (e.g., an accountholder associated with the electronic payment method involved in the pre-authorized electronic payment) has confirmed the electronic payment (e.g., whether the accountholder has confirmed knowledge of the payment through a call-back process). As described herein, the electronic payment processor can utilized the third data in fraud assessment process, during which the electronic payment may or may not be confirmed by the electronic payment processor.

In the example of FIG. 3, the flowchart 300 continues to module 310 with providing the merchant with fourth data regarding the validity of the purchase transaction. In some implementations, providing the merchant can comprise providing the fourth data to a merchant system associated with the merchant, where the merchant system may or may not be handling the purchase transaction currently at issue. For some implementations, the fourth data can enable the merchant system to perform a rescue process with respect to the purchase transaction.

Figure 4:
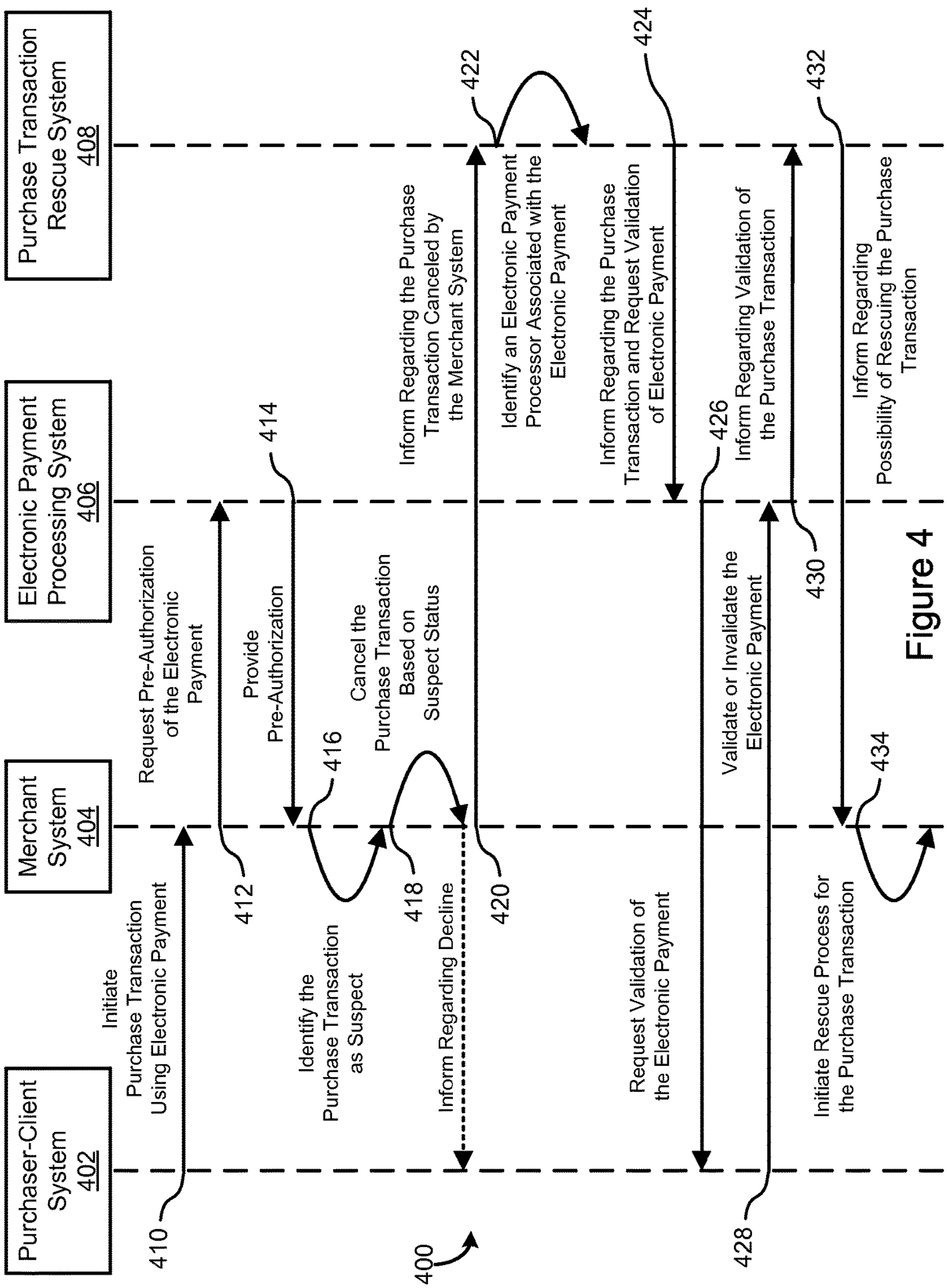
FIG. 4 depicts a diagram of an example sequence of operations for rescuing transactions in accordance with some implementations.

FIG. 4 depicts a diagram 400 of an example sequence of operations for rescuing transactions in accordance with some implementations. In FIG. 4, the sequence of operations involves a purchaser-client system 402, a merchant system 404, an electronic payment processing system 406, and a purchase transaction rescue system 408. FIG. 4 illustrates only some sequences of operations possible in various implementations, but some implementations can have alternative sequences where the order of operations is permuted, the order is reorganized for parallel execution, or the sequence involves operations different from the ones shown.

In the example of FIG. 4, the sequence begins at operation 410 with the purchaser-client system 402 initiating a purchase transaction with the merchant system 404 where the purchase transaction uses an electronic payment. For some implementations, the initiation of the purchase transaction can comprise a purchase order submitted to the merchant system 404 by a purchaser through the purchaser-client system 402. Next, the sequence continues to operation 412 with the merchant system 404 can request pre-authorization of the electronic payment from the electronic payment processing system 406. The electronic payment processing system 406 can be one suitable for processing the electronic payment. Subsequently, the sequence continues to operation 414 with the electronic payment processing system 406 providing a pre-authorization in response to the request of operation 412.

Thereafter, the sequence continues to operation 416 with the merchant system 404 identifying the purchase transaction as suspect. In accordance with some implementations, the merchant system 404 could identify the purchase transaction as suspect based on such factors as: the specific electronic payment method selected for use in the purchase transaction (e.g., type of electronic payment method), the purchase history of the purchaser involved in the purchase transaction, the purchase history of the item (e.g., good or service) being sold, the cost of the purchase order (e.g., total cost of the purchase order or the cost of individual items therein), or various analytics performed on purchases (e.g., analytics generated by the merchant or by a third-party service).

Next, the sequence continues to operation 418 with the merchant system 404 canceling the purchase transaction based on the purchase transaction being suspect. For some implementations, operation 418 may or may not result in the merchant system 404 informing the purchaser-client system 402 of the cancellation.

After operation 418, the sequence continues to operation 420 with the merchant system 404 informing the purchase transaction rescue system 408 regarding the purchase transaction canceled by the merchant system 404. Subsequently, the sequence continues to operation 422 with the purchase transaction rescue system 408 identifying an electronic payment processor associated with the electronic payment. The electronic payment processor identified by the purchase transaction rescue system 408 can based on the suitability (e.g., compatibility) of the electronic payment processor for processing the electronic payment.

Eventually, the sequence can continue to operation 424 with the purchase transaction rescue system 408 informing the electronic payment processing system 406 regarding the purchase transaction canceled by the merchant system 104, and the purchase transaction rescue system 408 requesting validation of the electronic payment associated with the associated with the purchase request. After, the sequence continues to operation 426 with the electronic payment processing system 406 requesting validation of the electronic payment at the purchaser-client system 402 (e.g., by the purchaser). In certain implementations, the request for validation of the electronic payment can include details regarding the purchase transaction. In response, the sequence continues to operation 428 with the purchaser-client system 402 validating or invalidating the electronic payment. According to some implementations, the purchaser-client system 402 can validate the electronic payment by the purchaser at the purchaser-client system 402 confirm the electronic payment, and invalidate the electronic payment by the purchaser at the purchaser-client system 402 denying the electronic payment.

Next, the sequence continues to operation 430 with the electronic payment processing system 406 informing the purchase transaction rescue system 408 regarding validation of the purchase transaction canceled by the merchant. Based on the validation information received from the electronic payment processing system 406, the purchase transaction rescue system 408 can determine whether the purchase transaction is a candidate for possible rescue. Subsequently, the sequence continues to operation 432 with the purchase transaction rescue system 408 informing the merchant system 404 regarding the possibility of rescue the purchase transaction. Depending on the implementation, the purchase transaction rescue system 408 can inform the merchant system 404 regarding those suspect purchase transactions that are possible for rescue, those suspect purchase transaction that are possible for rescue, or both.

Finally, the sequence can continue to operation 434 with the merchant system 404 initiating a rescue process for the purchase transaction. According to some embodiments, the merchant system 404 can initiate the rescue process for based on the information the purchase transaction rescue system 408 provides with respect to the purchase transaction. In some implementations, the rescue process can comprise the merchant system 404 reinstating or reversing the status of the purchase transaction. The rescue process could comprise the merchant system 404 automatically rescuing the purchase transaction, based on the information provided by the purchase transaction rescue system 408, and without purchaser intervention. Alternatively, the rescue process could comprise the merchant system 404 informing the purchaser-client system 402 of the possibility the purchase transaction being rescued, or soliciting a response from the purchaser (e.g., through the purchaser-client system 402) indicating whether the purchaser desires to rescue the purchase transaction.

FIG. 5 depicts a diagram 500 of an example system on which techniques described herein can be implemented. The computer system depicted can be a conventional computer system that can be used as a client computer system, such as a wireless client or a workstation, or a server computer system. The computer system depicted includes a computer 502, I/O devices 504, and a display device 506. The computer 502 includes a processor 508, a communications interface 510, memory 512, display controller 514, non-volatile storage 516, and I/O controller 518. The computer 502 may be coupled to or include the I/O devices 504 and display device 506.

The computer 502 interfaces to external systems through the communications interface 510, which may include a modem or network interface. It will be appreciated that the communications interface 510 can be considered to be part of the computer system depicted or a part of the computer 502. The communications interface 510 can be an analog modem, ISDN modem, cable modem, token ring interface, satellite transmission interface (e.g. "direct PC"), or other interfaces for coupling a computer system to other computer systems.

The processor 508 may be, for example, a conventional microprocessor such as an Intel Pentium microprocessor or Motorola power PC microprocessor. The memory 512 is coupled to the processor 508 by a bus 520. The memory 512 can be Dynamic Random Access Memory (DRAM) and can also include Static RAM (SRAM). The bus 520 couples the processor 508 to the memory 512, also to the non-volatile storage 516, to the display controller 514, and to the I/O controller 518.

The I/O devices 504 can include a keyboard, disk drives, printers, a scanner, and other input and output devices, including a mouse or other pointing device. The display controller 514 may control in the conventional manner a display on the display device 506, which can be, for example, a cathode ray tube (CRT) or liquid crystal display (LCD). The display controller 514 and the I/O controller 518 can be implemented with conventional well known technology.

The non-volatile storage 516 is often a magnetic hard disk, an optical disk, or another form of storage for large amounts of data. Some of this data is often written, by a direct memory access process, into memory 512 during execution of software in the computer 502. One of skill in the art will immediately recognize that the terms "machine-readable medium" or "computer-readable medium" includes any type of storage device that is accessible by the processor 508 and also encompasses a carrier wave that encodes a data signal.

The computer system depicted is one example of many possible computer systems which have different architectures. For example, personal computers based on an Intel microprocessor often have multiple buses, one of which can be an I/O bus for the peripherals and one that directly connects the processor 508 and the memory 512 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 512 for execution by the processor 508. A Web TV system, which is known in the art, is also considered to be a computer system, but it may lack some of the features shown in FIG. 5, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Discussions utilizing terms such as "processing" or "computing" or "calculating" or "determining" or "displaying" or the like, generally refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A purchase transaction rescue system comprising:

a purchase transaction information engine configured to receive first data regarding a purchase transaction between a purchaser and a merchant from a merchant system associated with the merchant, the merchant system being connected to the purchase transaction rescue system over a computer network, the purchase transaction involving a pre-authorization by an electronic payment processing system associated with an electronic payment method, for payment by a true purchaser client to the merchant using the electronic payment method, the purchase transaction identified as a suspect purchase transaction by the merchant system and declined by the merchant system, the electronic payment processing system being connected to the purchase transaction rescue system over the computer network;

an electronic payment processor information engine configured to provide the electronic payment processing system with second data regarding the purchase transaction, the electronic payment processing system being configured to assist in processing payments by the electronic payment method, the second data including a request for the electronic payment processing system to send, in lieu of the purchase transaction rescue system, a validity request for payment of the purchase transaction to a purchaser client system associated with the true purchaser client, to validate the payment of the purchase transaction, the purchaser client system being connected to the electronic payment processing system over a computer network;

a purchase transaction validation engine configured to receive from the electronic payment processing system third data regarding validity of the payment of the purchase transaction, the validity of the payment of the purchase transaction determined by the electronic payment processing system from a response to the validity request received by the electronic payment processing system from the purchaser client system;

a merchant system data interface engine configured to provide the merchant system with fourth data indicating validity of rescuing the purchase transaction based on the third data, to cause the merchant system to reinstate the purchase transaction between the purchaser and the merchant.

2. The purchase transaction rescue system of claim 1, wherein the merchant system comprises an e-commerce web site.

3. The purchase transaction rescue system of claim 1, further comprising an electronic payment processor identification engine configured to identify, based on the first data, the electronic payment processing system associated with the electronic payment method.

4. The purchase transaction rescue system of claim 1, wherein the electronic payment method comprises a credit card or a debit card.

5. The purchase transaction rescue system of claim 1, wherein the electronic payment processing system is associated with an issuing bank, an acquiring bank, a payment processor, or a payment gateway provider.

6. The purchase transaction rescue system of claim 1, wherein the electronic payment method comprises a digital wallet payment associated with a credit card or a debit card.

7. A method comprising:

receiving, by a purchase transaction information engine of a purchase transaction rescue system, first data regarding a purchase transaction between a purchaser and a merchant from a merchant system associated with the merchant, the merchant system being connected to the purchase transaction rescue system over a computer network, the purchase transaction involving a pre-authorization by an electronic payment processing system associated with an electronic payment method, for payment by a true purchaser client to the merchant using the electronic payment method, the purchase transaction identified as a suspect purchase transaction by the merchant system and declined by the merchant system, the electronic payment processing system being connected to the purchase transaction rescue system over the computer network;

providing, by an electronic payment processor information engine of the purchase transaction rescue system, the electronic payment processing system with second data regarding the purchase transaction, the electronic payment processing system being configured to assist in processing payments by the electronic payment method, the second data including a request for electronic payment processing system to send, in lieu of the purchase transaction rescue system, a validity request for payment of the purchase transaction to a purchaser client system associated with the true purchaser client, to validate the payment of the purchase transaction, the purchaser client system being connected to the electronic payment processing system over a computer network;

receiving, by a purchase transaction validation engine of the purchase transaction rescue system, from the electronic payment processing system, third data regarding validity of the payment of the purchase transaction, the validity of the payment of the purchase transaction determined by the electronic payment processing system from a response to the validity request received by the electronic payment processing system from the purchaser client system;

providing, by a merchant system data interface engine of the purchase transaction rescue system, the merchant system with fourth data indicating validity of rescuing the purchase transaction based on the third data, to cause the merchant system to reinstate the purchase transaction between the purchaser and the merchant.

8. The method of claim 7, wherein the merchant system comprises an e-commerce website.

9. The method of claim 7, further comprising identifying, based on the first data, the electronic payment processing system associated with the electronic payment method.

10. The method of claim 7, wherein the electronic payment method comprises a credit card or a debit card.

11. The method of claim 7, wherein the electronic payment processing system is associated with an issuing bank, an acquiring bank, a payment processor, or a payment gateway provider.

12. The method of claim 7, wherein the electronic payment method comprises a digital wallet payment associated with a credit card or a debit card.

13. A purchase transaction rescue system comprising:

means for receiving first data regarding a purchase transaction between a purchaser and a merchant from a merchant system associated with the merchant, the merchant system being connected to the purchase transaction rescue system over a computer network, the purchase transaction involving a pre-authorization by an electronic payment processing system associated with an electronic payment method, for payment by a true purchaser client to the merchant using the electronic payment method, the purchase transaction identified as a suspect purchase transaction by the merchant system and declined by the merchant system, the electronic payment processing system being connected to the purchase transaction rescue system over the computer network;

means for providing the electronic payment processing system with second data regarding the purchase transaction, the electronic payment processing system being configured to assist in processing payments by the electronic payment method, the second data including a request for the electronic payment processing system to send, in lieu of the purchase transaction rescue system, a validity request for payment of the purchase transaction to a purchaser client system associated with the true purchaser client, to validate the payment of the purchase transaction, the purchaser client system being connected to the electronic payment processing system over a computer network;

means for receiving from the electronic payment processing system third data regarding validity of the payment of the purchase transaction, the validity of the payment of the purchase transaction determined by the electronic payment processing system from a response to the validity request received by the electronic payment processing system from the purchaser client system;

means for providing the merchant system with fourth data indicating validity of rescuing the purchase transaction based on the third data, to cause the merchant system to reinstate the purchase transaction between the purchaser and the merchant.

14. The purchase transaction rescue system of claim 13, wherein the electronic payment method comprises a digital wallet payment associated with a credit card or a debit card.

* * * * *